(12) United States Patent
Gowda et al.

(10) Patent No.: US 11,556,553 B2
(45) Date of Patent: Jan. 17, 2023

(54) MULTI-STAGE ADAPTABLE CONTINUOUS LEARNING / FEEDBACK SYSTEM FOR MACHINE LEARNING MODELS

(71) Applicant: SAP SE, Walldorf (DE)

(72) Inventors: Kumaraswamy Gowda, Bangalore (IN); Nithya Rajagopalan, Bangalore (IN); Nishant Kumar, Bangalore (IN); Panish Ramakrishna, Bangalore (IN)

(73) Assignee: SAP SE, Walldorf (DE)

( * ) Notice: Subject to any disclaimer, the term of this patent is extended or adjusted under 35 U.S.C. 154(b) by 100 days.

(21) Appl. No.: 17/108,915

(22) Filed: Dec. 1, 2020

(65) Prior Publication Data

US 2022/0171777 A1 Jun. 2, 2022

(51) Int. Cl.
*G06F 7/00* (2006.01)
*G06F 16/2458* (2019.01)
*G06F 16/242* (2019.01)
*G06F 40/30* (2020.01)
*G06N 20/00* (2019.01)
*G06K 9/62* (2022.01)
*G06F 16/28* (2019.01)

(52) U.S. Cl.
CPC ...... *G06F 16/2468* (2019.01); *G06F 16/2428* (2019.01); *G06F 16/285* (2019.01); *G06F 40/30* (2020.01); *G06K 9/628* (2013.01); *G06N 20/00* (2019.01)

(58) Field of Classification Search
CPC ............. G06F 16/2468; G06F 16/2428; G06F 16/285; G06F 16/24522; G06F 16/2453; G06F 16/243; G06N 20/00; G06N 40/30; G06K 9/628
See application file for complete search history.

(56) References Cited

U.S. PATENT DOCUMENTS

| 5,820,386 A | * | 10/1998 | Sheppard, II | .......... | G09B 5/065 |
| | | | | | 434/323 |
| 2004/0186706 A1 | * | 9/2004 | Itoh | ....................... | G06F 40/211 |
| | | | | | 704/10 |
| 2006/0028450 A1 | * | 2/2006 | Suraqui | ............... | G06F 3/04886 |
| | | | | | 345/169 |
| 2006/0176283 A1 | * | 8/2006 | Suraqui | ............... | G06F 3/04886 |
| | | | | | 345/169 |

* cited by examiner

*Primary Examiner* — Mohammad A Sana
(74) *Attorney, Agent, or Firm* — Klarquist Sparkman, LLP

(57) ABSTRACT

Data is received that specifies a term generated by user input in a graphical user interface. Thereafter, the term is looked up in a dictionary in which there are multiple classes for terms. The term can be classified based on a first class having a top ranked effective count for the term within the dictionary when a ratio of the first class relative to a second class having a second ranked effective count for the term in the dictionary is above a pre-defined threshold. In addition, the term is classified using a machine learning model when the ratio of the first class relative to the second class is below the pre-defined threshold. Data can be provided which characterizes the classifying. Related apparatus, systems, techniques and articles are also described.

20 Claims, 4 Drawing Sheets

⚠ Excel file imported and contents mapped to the template or system terms. Multiple matches found for the following terms:
1) Item Name  2) Cost  3) Quantity  4) Bonus/Penalty Amount  5) Discount Amount  6) Discount Percentage  7) Factory  8) Incoterms  9) Index Amount
10) Index Category  11) Lead Time  12) Manufacturer Name  13) Manufacturer Part ID  14) Material Code  15) Material Group  16) Material Number
17) Material Type  18) Payment Terms  19) Plant  20) * Ship To  21) * Shipping Cost  22) * Shipping Terms  23) * Surcharge Amount  24) Tax Items to import                                                                                                             UE test data 1.xlsx Line items                                                                              [Search 🔍]

| Item Name ⋮⋮ Mapped to Item Na... | Cost ⋮⋮ Mapped to Price | Quantity ⋮⋮ Mapped to Quantity | Alternate Type ⋮⋮ New term | Bonus/Penalty ⋮⋮ | Discount Amount ⋮⋮ Mapped to Discount A... | Discount Percentage ⋮⋮ Mapped to Discount P... | Expected Limit ⋮⋮ New term | Factory Mapped to Factory |
|---|---|---|---|---|---|---|---|---|
| one | 10 | 1 | | | 33 | 0.025 | 1000 | factory1 |
| two | 20 | 2 | | | 34 | 0.036 | 2000 | factory2 |
| three | 30 | 3 | | | 35 | 0.047 | 3000 | factory3 |
| four | 40 | 4 | | | 36 | 0.023 | 4000 | factory4 |
| five | 50 | 5 | | | 37 | 0.081 | 5000 | factory5 |
| six | 60 | 6 | | | 38 | 0.056 | 6000 | factory6 |

✕
Map to this term ?
[Select a term ▾]
Display name ?
[Alternate Type ▾]
Answer type ?
[Text ▾]
Required type
[Not Required ▾]
[Apply] [Cancel]

MULTI-STAGE ADAPTABLE CONTINUOUS LEARNING / FEEDBACK SYSTEM FOR MACHINE LEARNING MODELS

TECHNICAL FIELD

The subject matter described herein relates to a multiple stage continuous learning/feedback system that utilizes a dictionary in combination with a machine learning model.

BACKGROUND

Machine learning models are increasingly being incorporated into various computer-implemented business processes. Not only are machine learning models being adopted for enterprise-specific applications, they are also being deployed on a user-by-user basis (i.e., the machine learning models are individualized). Machine learning models, despite their advantages, can suffer from various issues. As an example, machine learning models with limited available historic data often have cold starts during which they misclassify inputs at unacceptable levels (e.g., 90% accuracy levels). Further, machine learning models also have a tendency to misclassify rarer inputs (i.e., minority classes) which either do not have meaningful training data and/or are relatively anomalous in nature. Moreover, difficulties can arise when assigning weights to fresh training data based on user feedback.

SUMMARY

Data is received that specifies a term generated by user input in a graphical user interface. Thereafter, the term is looked up in a dictionary in which there are multiple classes (i.e., classifications mapping the term to a result) for terms (e.g., alphanumeric strings such as words). The term can be classified based on a first class having a top ranked effective count for the term within the dictionary when a ratio of the first class relative to a second class having a second ranked effective count for the term in the dictionary is above a pre-defined threshold. In addition, the term is classified using a machine learning model when the ratio of the first class relative to the second class is below the pre-defined threshold. Data can be provided which characterizes the classifying.

The effective counts for the first class and the second class can be calculated by applying a time decay factor to a number of historical counts for each such class within the dictionary.

The looking up can use fuzzy matching to identify classes corresponding to the term.

The entry in the graphical user interface can be updated using the classification of the term.

The dictionary can be a multilevel dictionary having at least two levels such that a first of the levels taking priority over a second of the levels when there are conflicting classifications between the levels.

The received data can be pruned to remove pre-defined values or terms.

Semantic hashing or latent sematic indexing can be applied to the received data.

Providing data in the current context can include one or more of: causing the data characterizing the classifying to be displayed in an electronic visual display, loading the data characterizing the classifying into memory, storing the data characterizing the classifying in physical persistence, or transmitting the data characterizing the classifying to a remote computing system.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can be used to alleviate issues associated with widespread organizational model deployment including resource requirements, operations and maintenance challenges, data requirements and the like. Rather than providing personalized machine learning models per user, the current subject matter can be used across an organization in which users have similar classifications and the like.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is an example graphical user interface for use with aspects of the current subject matter;

DETAILED DESCRIPTION

The current subject matter is directed to a multi-stage adaptable continuous learning/feedback system for machine learning models in which a fuzzy dictionary can be used in connection with one or more machine learning models. The fuzzy dictionary captures user preferences deterministically at the desired hierarchy level (e.g., organization, group, or user) and can be refreshed for every training cycle for the machine learning model.

The current subject matter can be used in connection with various applications in which a user loosely enters terms (e.g., an alphanumeric string such as a word, etc.) (for example via an input prompt on a graphical user interface) that need to be associated with a particular category/type.

For example, the terms "cost" and "bid" might all be associated with the category "price".

Figure 1:
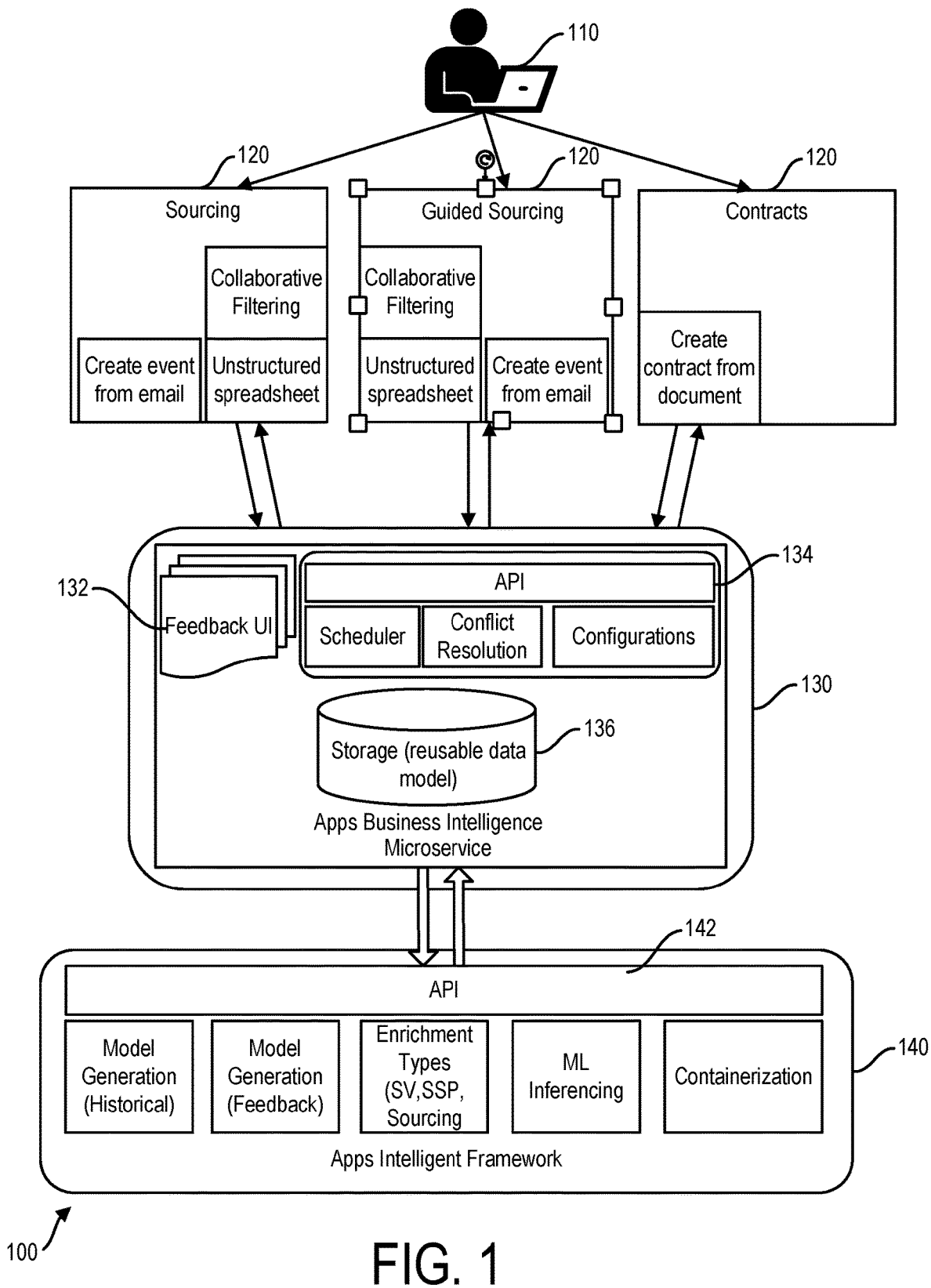
FIG. 1 is a diagram of a computing architecture for implementing aspects of the current subject matter.

FIG. 1 is a diagram 100 in which a user on a client computing device 110 can execute various applications 120 relating to, for example, sourcing, guided sourcing, contracts, and the like. These applications 120 can leverage an applications intelligent framework (AIF) 140 by way of an applications business intelligence microservice 130 such that terms entered in a graphical user interface (such as that provided in diagram 200 of FIG. 2) on the client computing device 110 via one of the applications 120 can be classified. The AIF 140 is a microservice that collects feedback from users for intelligence uses cases in a generic manner and which, can additionally, store feedback data obtained from users via the applications 120. The applications business intelligence microservice 130 is a microservice providing a platform to train/host ML models in a generic way which can be accessed by an API 134.

The sourcing and the guided sourcing applications 120 can leverage multiple machine learning algorithms to achieve various tasks including collaborative filtering. These applications can also create events from different sources including e-mails. In particular, with procurement solutions, events can include Request for proposal, Request for Information, Request for quotation, etc. During the process of creating events, machine learning algorithms can be leveraged to also implement certain tasks. In some cases, the applications 120 can create procurement events in software using an unstructured spreadsheet file (e.g., EXCEL, etc.) to import events data into the system.

In some cases, the applications business intelligence microservice 130 can provide a feedback user interface 132 which can be conveyed to the user via the graphical user interface of one of the corresponding application 120. The applications business intelligence microservice 130 can provide a scheduler that is automatically run to perform tasks including the triggering of jobs. A conflict resolution module can provide rule-based resolution of any conflicts. A configurations model can manage various configurable parameters.

The applications business intelligence microservice 130 accesses the AIF 140 via an API 142. The AIF 140 to perform certain tasks relating to machine learning models including data ingestion, scalable ML model training, scalable ML model inference/classification. The AIF 140 can be executed using a hardware platform that provides adequate processing power including, in some cases, graphical processing units (GPU) or other processors optimized for ML applications. The AIF 140 can also be used to provide various management functions in relation to ML models including scheduled retraining of ML models, modification of ML models, and the like.

Feedback data from the consumer applications 120 can be stored by the AIF 140 in a database 136 forming part of the applications business intelligence microservice 130. The AIF 140 can leverage this feedback to retrain ML models and incorporate user preference (received by way of the feedback) in near real time. The AIF 140 can provide different functionality relating to the machine learning model lifecycle including model generation using historical data generated by an application, model generation based on feedback data (i.e., the explicit feedback provided by a user such as illustrated in FIG. 2), enrichment types (manners in which to enrich a machine learning model or a process utilizing a machine learning model), machine learning inferencing (i.e., calculating predictions on input data using a machine learning model), containerization (i.e., packing the software into docker containers, etc.).

FIG. 2 is a view of a graphical user interface in which there are multiple values in an imported spreadsheet file. The user can provide feedback data via the graphical user interface by manually mapping terms that are not found in the dictionary (or alternatively to override classifications provided by the dictionary) to a class. Such selection can be via various graphical user interface elements including a drop down menus 210. Here, a machine learning algorithm is unable to map the Bonus/Penalty column to any of the terms that are classified in a dictionary. Stated differently, there are no classes associated with the term in the dictionary. In the dropdown GUI element, 210, the user has the opportunity to specify or change the class, and map "Bonus/Penalty" to a selected one of the drop down options. Each time a term is mapped to a particular class (whether via user feedback data or otherwise) can be considered a count.

Examples

TABLE 1

| Scenarios | Normalized difference between top two conflicts | Result |
| --- | --- | --- |
| Term 1—class 1—40 times | 0.8 in favor of class 1 | Term 1 in dictionary with class 1 |
| Term 1—class 2—2 times | | |
| Term 1—class 1—40 times | 0.6 in favor of class 1 | No entry, and fallback to ML model |
| Term 1—class 2—20 times | | |
| Term 1—class 1—40 times—all entry before 6 months | 0.8 in favor of class 2 | Term 1 in dictionary with class 2 |
| Term 1—class 2—6 times—all entry in last 1 months | | |

An effective count can be calculated for each classification of a term. The effective count can be based on the recency of the classifications of a term in the dictionary. In some variations, the effective count can be the result of applying a time decay factor based on a number of elapsed days (or other time periods) to the count (e.g., Effective Count=Count*time decay factor). For example, if feedback from a user was given yesterday (i.e., a user mapped a term to a particular class), the effective count for such class has more weight than user feedback given a year ago to a different class.

With reference to Table 2, below, feedback is given for input term T1. For example, 200 days ago, a user gave feedback for input T1 as C1 5 times. A time decay factor can be applied to that count resulting in an effective count of 2.26. Similarly for the last row, two days ago, the user gave feedback for T1 as class C2, which makes effective count considering time decay: 75.58. An example, formula for calculating effective count is as follows: Effective Count=Count*(365−Days Elapsed)/365.

TABLE 2

| Term | Class | Count | Days Elapsed | *Effective count |
| --- | --- | --- | --- | --- |
| T1 | C1 | 5 | 200 | 2.26 |
| T1 | C1 | 2 | 180 | 1.01 |
| T1 | C1 | 1 | 160 | 0.56 |
| T1 | C1 | 7 | 50 | 6.04 |
| T1 | C1 | 5 | 50 | 4.31 |

TABLE 2-continued

| Term | Class | Count | Days Elapsed | *Effective count |
|------|-------|-------|--------------|------------------|
| T1 | C1 | 1 | 45 | 0.87 |
| T1 | C2 | 45 | 3 | 44.63 |
| T1 | C2 | 76 | 2 | 75.58 |

To make the count difference between two values corresponding to effective counts have the same scale, such values can be normalized. For example, consider a first pair of effective counts (100, 1) and a second pair of effective counts (6,7). With the first pair, the value 100 is dominating and will be used to classify the corresponding term. With the second pair, neither of the effective counts is dominating and, as such, a normalized difference between these numbers can be calculated. An example formula to find the normalized difference between two values of effective counts can be as follows: (A,B)=A/(A+B)−B/(A+B) which, when applied to the values of the second pair of effective counts, results in a value of 0.77 which is above a pre-specified threshold (e.g., 0.75). In this example, the class 2 (corresponding to the value of 7) can be used to classify term 1 without the need to resort to using a machine learning model. Conversely, the machine learning model would be used to classify the term if the normalized difference between two effective counts is below the pre-specified threshold.

As noted above, the ultimate classification using the dictionary can be based on determining an effective count for each classification with, in some variations, a time decay factor which penalizes less recent classifications for the terms. An effective count difference between the top two candidates is then counted and compared against a threshold (which can be user definable). If it is above the threshold (e.g., 0.75, etc.), then the classification for the entry with the top effective count difference is utilized. Otherwise, other types of classification can be utilized including machine learning-based classification solutions.

In some variations, before the dictionary lookup, the text received from the user client device 110 and/or one of the applications 120 can be preprocessed. Such preprocessing can help reduce the keyspace in the domain. Different strategies can be applied depending on the length of text.

For shorter text, operations can be applied including one or more of:
1. Convert all text to lower case;
2. Remove all HTML tags and extract text from HTML elements;
3. Remove multilines within the text and replace the multilines with a single space;
4. Replace multispaces with a single space; and/or
5. Strip the string of any leading and trailing spaces.

For longer text, in addition to the preprocessing specified above for shorter text, additional processing operations can be undertaken including, for example, semantic hashing and/or latent semantic indexing.

Other types of preprocessing can be undertaken such as replacing certain entries (e.g., numbers, URLs, etc.) that are unique to a particular application with a placeholder (e.g., _NUM_,_URL_, etc.).

In considering where there might be different preprocessing for short and long text, if two paragraphs describe the same context, they should be mapped to same key space. The longer text length increases the probability of the use of different words or sequences. Semantic hashing and latent semantic indexing both return vectors and distances can be measured to identify similar content/words.

The preprocessing of the text can allow for fuzzy look up for keys in the dictionary. For example, Cost and Cost($) will be treated as the same key.

In some variations, the dictionary can be a multilevel dictionary corresponding to different granularities such as organization level, user group level, individual user level, and the like. A multilevel dictionary can be advantageous in that it can capture preferences at the user level/organization level. With the multilevel dictionary, if two users have contradicting preference, an entry can be present in the user level of the dictionary and not in the organization level of the dictionary. If the user has not previously expressed a preference for a particular classification, the classification provided at the organization level can be used. As another example, a conflict between the user level and the organization level can result in the user level prevailing (such that the user level information is used to classify the term).

Table 3 below shows how various conflicts might be resolved. In this table Tn is the input text and Cn is the output class (i.e., the final classification).

TABLE 3

| User 1 preference | User 2 Preference | Organization preference | Final Prediction for User 1 |
|-------------------|-------------------|-------------------------|------------------------------|
| T1 => C1 | NA | T1 = >C2 | T1 => C1 |
| NA | NA | T1 => C2 | T1 => C2 |
| T1 => C1 | T1 => C2 | T1 => C2 | T1 => C1 |
| NA | T1 => C2 | T1 => C1 | T1 => C1 |
| T1 => C1 | NA | NA | T1 => C1 |

In some cases, various mechanisms can be employed to ensure that the size of the dictionary does not become overly large which can degrade service. In some variations, a Least Recent Used (LRU) cache can be used to manage high number of entries in the dictionary. As the related dictionary will already be pre sent in memory, this will ensure that the most frequent users will have low run time latency. In other words, the dictionary can be loaded into memory for only frequent users in order to minimize unnecessary load to the main memory of an in-memory database. This makes the continuous learning more efficient as the feedback data is continuously modified based on demand or season.

Training Flow. In some implementations, the dictionary and any machine learning models can be generated in parallel. First, historical transaction data can be read along with feedback data provided by users in classifying certain terms and the like. Any duplicate entries can be deleted (i.e., de-duplicated, etc.). Further, as described above, the data can be processed to make the entries more compact which, in turn, can speed up classification and/or increase accuracy of classification. The dictionary can then be created with keys for various terms and the like along with county information and a corresponding class (i.e., term classification). In addition, the historical data can be used to generate or otherwise train one or more machine learning models which can be used to classify when the dictionary is not able to provide a definitive (or above a threshold) result. The model can then be bundled together in a compressed file (e.g., .zip file).

Inference Flow. The flow during runtime (sometimes referred to as inference stage) commences with a term being input by a user via an application. The term, as used herein, can be a string of text and the like which can require preprocessing. A dictionary corresponding to the user and/or an organization of the user (in the case of a multilevel dictionary) can be loaded. Fuzzy matching can be used to look up whether the term is in the dictionary (or any variations therefor as provided by the fuzzy matching algorithm). If the term is found on the user level, the corresponding classification is returned as the classification. If the term is not found on the user level but is found on the organization level, the corresponding classification is returned as the classification. If the term is not found on any/either of the levels in the dictionary, then the machine learning model inference is used in lieu of the dictionary (which is more computationally expensive, etc.).

In some variations, the machine learning models can be trained using active learning in which feedback from the user 110 via the applications 120 is used to train the model despite challenges of minority class, error rates and the need for recency bias.

The current multi-stage machine language pipeline can adapt efficiently to the user feedback in one training cycle. The machine language pipeline handles user preferences well within the organization level with following advantages. The machine language pipeline does not need a lot of data from users as the preferences of the organization as a whole can be used to provide the data needed to train the machine learning models. The machine language pipeline obviates the need to create user level machine language models while still providing user level preferences (when a multilevel dictionary is employed). The multilevel dictionary, in particular, provides advantages in that preprocessing can vary based on needs (short sentences vs long sentences); the threshold for classification can be varied based on user preference and/or organization process; fuzzy matching can be used across different levels of the dictionary; and the dictionary can be bypassed in case the user or organization does not match (thereby avoiding issues associated with cold starts, etc.). The machine language pipeline also provides enhanced continuous learning (inside the dictionary and in the model) even when user preferences changes with demand or season.

Figure 3:
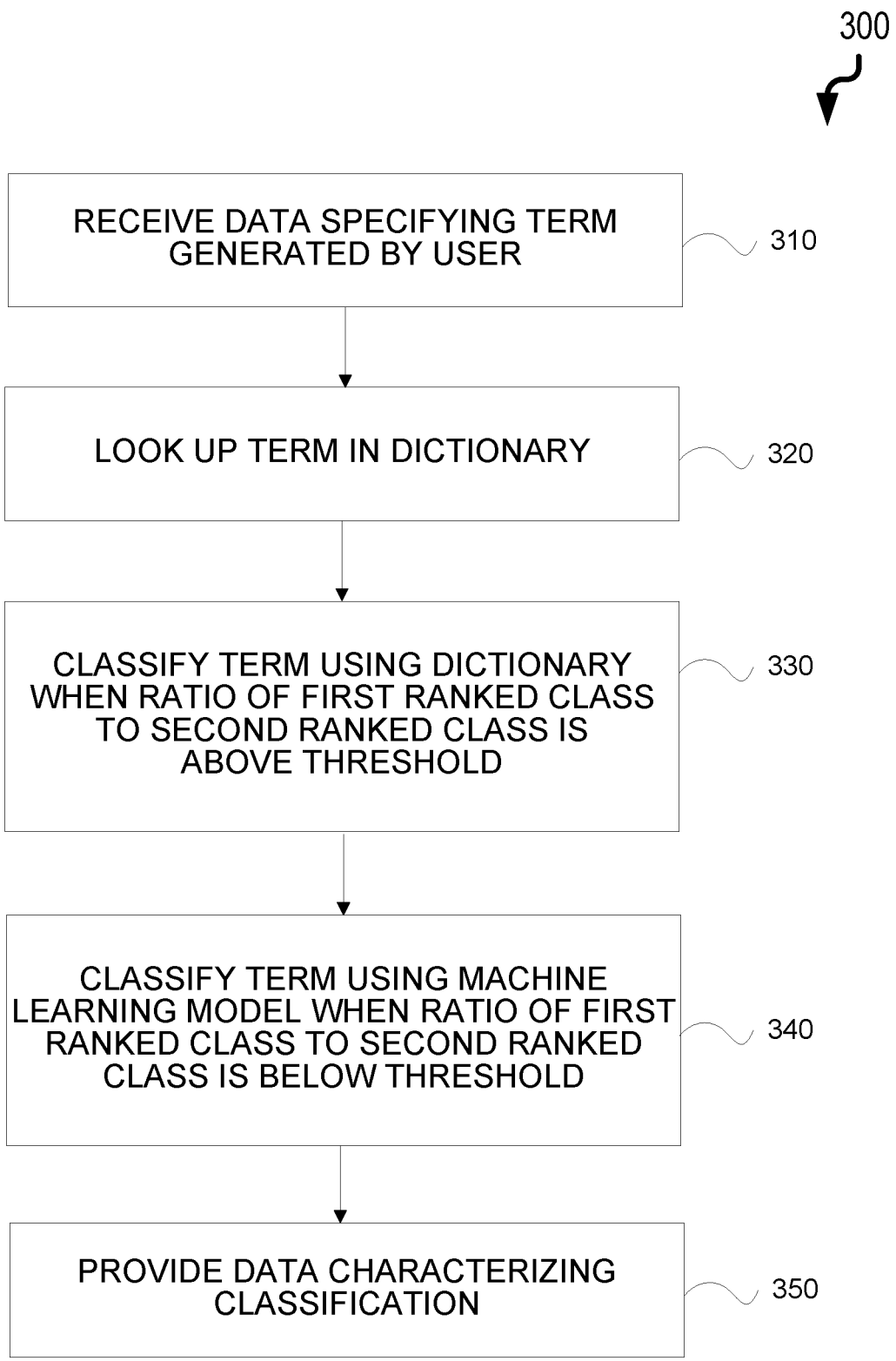
FIG. 3 is a process flow diagram for operation of a multi-stage adaptable continuous learning/feedback system for machine learning models.

FIG. 3 is a process flow diagram 300 in which, at 310, data is received that specifies a term generated by user input in a graphical user interface. Thereafter, at 320, using, for example, a web service, the term is looked up in a dictionary in which there are multiple classes for terms. The term is then, at 330, classified based on a first class having a top ranked effective count for the term within the dictionary when a ratio of the first class relative to a second class having a second ranked effective count for the term in the dictionary is above a pre-defined threshold. Alternatively, at 340, the term is classified using a machine learning model when the ratio of the first class relative to the second class is below the pre-defined threshold. Data can then be provided, at 350, that characterizes the classification.

Figure 4:
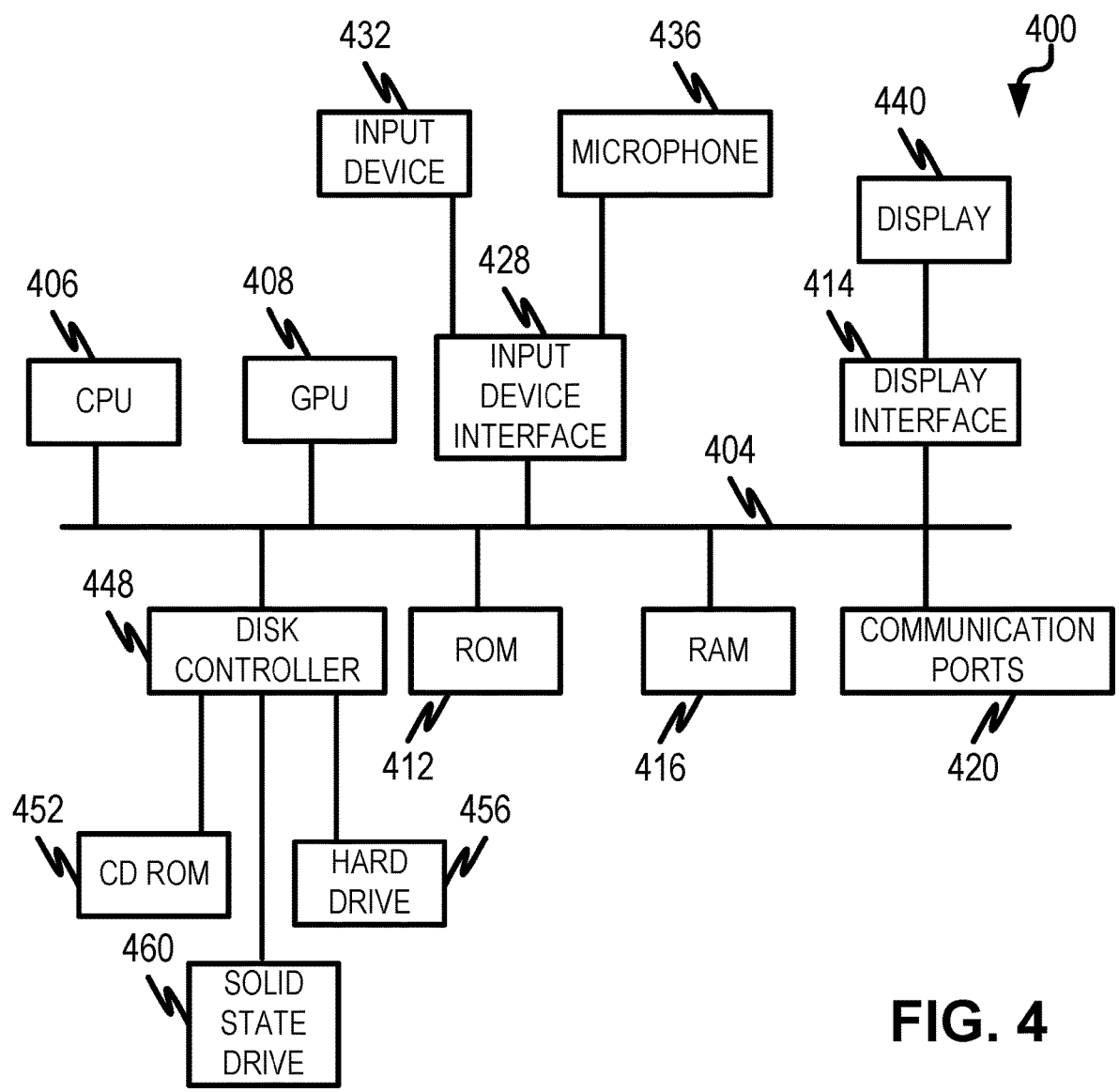
FIG. 4 is a computing device for implementing aspects of the current subject matter.

FIG. 4 is a diagram 400 illustrating a sample computing device architecture for implementing various aspects described herein. A bus 404 can serve as the information highway interconnecting the other illustrated components of the hardware. A processing system 406 labeled CPU (central processing unit) (e.g., one or more computer processors/data processors at a given computer or at multiple computers) and/or a processing system 408 labeled GPU (graphical processing unit) can perform calculations and logic operations required to execute a program. A non-transitory processor-readable storage medium, such as read only memory (ROM) 412 and random access memory (RAM) 416, can be in communication with the processing systems 406, 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal solid state drives such as 460, external or internal CD-ROM, CD-R, CD-RW or DVD, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving data specifying a term generated by user input in a graphical user interface;
   looking up the term in a dictionary in which there are multiple classes for terms;
   classifying the term based on a first class having a top ranked effective count for the term within the dictionary when a ratio of the first class relative to a second class having a second ranked effective count for the term in the dictionary is above a pre-defined threshold;
   classifying the term using a machine learning model when the ratio of the first class relative to the second class is below the pre-defined threshold; and
   providing data characterizing the classifying.

2. The method of claim 1 further comprising:
   calculating effective counts for the first class and effective counts for the second class by applying a time decay factor to a number of historical counts for each such class within the dictionary.

3. The method of claim 1, wherein the looking up uses fuzzy matching to identify classes corresponding to the term.

4. The method of claim 1 further comprising:
   causing the graphical user interface to be updated using the classification of the term.

5. The method of claim 1, wherein the dictionary is a multilevel dictionary having at least two levels, a first of the levels taking priority over a second of the levels when there are conflicting classifications between the levels.

6. The method of claim 1 further comprising:
   pruning the received data to remove pre-defined values or terms.

7. The method of claim 1 further comprising:
   applying semantic hashing or latent semantic indexing to the received data.

8. The method of claim 1, wherein the providing data comprises: causing the data characterizing the classifying to be displayed in an electronic visual display, loading the data characterizing the classifying into memory, storing the data characterizing the classifying in physical persistence, or transmitting the data characterizing the classifying to a remote computing system.

9. A system comprising:
   at least one data processor; and
   memory storing instructions which, when executed by the at least one data processor, result in operations comprising:
     receiving data specifying a term generated by user input in a graphical user interface;
     looking up the term in a dictionary in which there are multiple classes for terms;
     classifying the term based on a first class having a top ranked effective count for the term within the dictionary when a ratio of the first class relative to a second class having a second ranked effective count for the term in the dictionary is above a pre-defined threshold;
     classifying the term using a machine learning model when the ratio of the first class relative to the second class is below the pre-defined threshold; and
     providing data characterizing the classifying.

10. The system of claim 9, wherein the operations further comprise:
    calculating effective counts for the first class and effective counts for the second class by applying a time decay factor to a number of historical counts for each such class within the dictionary.

11. The system of claim 9, wherein the looking up uses fuzzy matching to identify classes corresponding to the term.

12. The system of claim 9, wherein the operations further comprise:
    causing the graphical user interface to be updated using the classification of the term.

13. The system of claim 9, wherein the dictionary is a multilevel dictionary having at least two levels, a first of the levels taking priority over a second of the levels when there are conflicting classifications between the levels.

14. The system of claim 9, wherein the operations further comprise:
pruning the received data to remove pre-defined values or terms.

15. The system of claim 9, wherein the operations further comprise:
applying semantic hashing or latent sematic indexing to the received data.

16. The system of claim 9, wherein the providing data comprises: causing the data characterizing the classifying to be displayed in an electronic visual display, loading the data characterizing the classifying into memory, storing the data characterizing the classifying in physical persistence, or transmitting the data characterizing the classifying to a remote computing system.

17. A non-transitory computer program product storing instructions which, when executed by at least one computing device, result in operations comprising:
receiving data specifying a term generated by user input in a graphical user interface;
using fuzzy matching to look up the term in a dictionary in which there are multiple classes for terms;
classifying the term based on a first class having a top ranked effective count for the term within the dictionary when a ratio of the first class relative to a second class having a second ranked effective count for the term in the dictionary is above a pre-defined threshold;
classifying the term using a machine learning model when the ratio of the first class relative to the second class is below the pre-defined threshold; and
providing data characterizing the classifying.

18. The non-transitory computer program product of claim 17, wherein the operations further comprise: calculating effective counts for the first class and effective counts for the second class by applying a time decay factor to a number of historical counts for each such class within the dictionary.

19. The non-transitory computer program product of claim 18, wherein the dictionary is a multilevel dictionary having at least two levels, a first of the levels taking priority over a second of the levels when there are conflicting classifications between the levels.

20. The non-transitory computer program product of claim 19, wherein the providing data comprises: causing the data characterizing the classifying to be displayed in an electronic visual display, loading the data characterizing the classifying into memory, storing the data characterizing the classifying in physical persistence, or transmitting the data characterizing the classifying to a remote computing system.

* * * * *